United States Patent [19]
Moody

[11] Patent Number: 5,647,818
[45] Date of Patent: Jul. 15, 1997

[54] SHIFTER INTERLOCK FOR AN AUTOMATIC TRANSMISSION

[75] Inventor: John W. Moody, Clarkston, Mich.

[73] Assignee: Pontiac Coil, Inc., Waterford, Mich.

[21] Appl. No.: 410,909

[22] Filed: Mar. 27, 1995

[51] Int. Cl.[6] .......................... F16H 59/74; F16H 63/36
[52] U.S. Cl. .................. 477/99; 70/248; 74/477; 192/4 A; 477/96
[58] Field of Search ................... 74/477, 473 SW; 477/99, 96; 192/4 A; 70/248, 254

[56] References Cited

U.S. PATENT DOCUMENTS

| 4,473,141 | 9/1984 | Mochida . | |
|---|---|---|---|
| 4,887,702 | 12/1989 | Ratke et al. | 192/4 A |
| 4,936,431 | 6/1990 | Shinpo | 74/473 SW |
| 4,955,935 | 9/1990 | Katayama | 192/4 A |
| 4,986,399 | 1/1991 | Gokee | 192/4 A |
| 5,027,931 | 7/1991 | Ratke et al. | 192/9 |
| 5,035,156 | 7/1991 | Roble | 70/248 |
| 5,052,509 | 10/1991 | Dzioba | 74/477 |
| 5,076,114 | 12/1991 | Moody | 74/501.5 R |
| 5,129,494 | 7/1992 | Rolunski | 192/4 A |
| 5,133,436 | 7/1992 | de Crouppe et al. | 192/4 A |
| 5,176,231 | 1/1993 | Moody et al. | 192/4 A |
| 5,211,271 | 5/1993 | Osborne et al. | 477/96 |
| 5,275,065 | 1/1994 | Ruiter | 74/483 R |

*Primary Examiner*—Charles A. Marmor
*Assistant Examiner*—Sherry Lynn Estremsky
*Attorney, Agent, or Firm*—Young & Basile, P.C.

[57] ABSTRACT

An automotive shifter interlock in which a slidable shift lever release member is mechanically locked in a shift-release-inhibit position by the combination of an electromagnet bolt and an ignition switch bolt. The ignition switch bolt mechanically locks the electromagnet bolt in a position locking the shift lever release member even though no power is supplied to the electromagnet. After the ignition switch is closed and the ignition switch bolt withdrawn, the electromagnet continues to provide an electromagnetic lock until the brake pedal is depressed.

8 Claims, 3 Drawing Sheets

SHIFTER INTERLOCK FOR AN AUTOMATIC TRANSMISSION

FIELD OF THE INVENTION

This invention relates to shifter interlocks for automotive vehicles equipped with automatic transmissions and more particularly to a shifter interlock involving the combination of both electromagnetic and purely mechanical controls.

BACKGROUND OF THE INVENTION

Operator manipulation of the automatic transmission of a motor vehicle is typically accomplished by way of a shift lever mounted either on or near the steering column of the vehicle or in or adjacent a console mounted on the floor of the vehicle between the driver's seat and the front passenger seat. The shift lever is mounted for primary movement between a PARK position and the Forward and Reverse driving positions, usually separated by a "Neutral" position. The shift lever is also mounted to provide a release movement, usually at right angles to the primary movement, through which a pawl is lifted out of and seated into a detent to hold the shift lever in the PARK position and prevent inadvertent movement of the lever in the primary mode; i.e., from PARK to one of the drive positions. The release movement can be implemented in several ways including (a) lateral shift lever movement, (b) fore-and-aft shift lever movement, (c) axial shift lever movement, and (d) depression of a push button.

Beginning in about the late 1980's automobiles manufactured for sale and/or use in the United States have been equipped with one of several types of shift lever interlocks, the most typical being a solenoid-implemented interlock which prevents the shift lever from being moved out of the PARK position until the operator has activated the ignition circuit and depressed the brake pedal. Depression of the brake pedal closes a switch normally associated with the brake light circuit to either supply or cut off the supply of power to a solenoid coil thereby to position an armature connected pin. Depending on the particular implementation of the interlock the solenoid pin can be used to latch either the shift lever primary movement or the release movement.

The interlock, although commonly involving the brake light circuit, can be associated with any automotive system capable of producing an appropriate electrical signal; e.g., a seat belt switch or a seat occupancy switch. Examples of such interlocks are illustrated in U.S. Pat. Nos. 4,854,193 and 4,986,399.

U.S. Pat. No. 4,887,702, assigned to United Technologies Automotive, Inc., discloses an interlock for a floor mounted shifter in which both a mechanical ignition lock and a brake/shift lock solenoid are connected to a pivotally movable PARK/LOCK member in the shifter by means of one or more cables. According to the further disclosure of U.S. Pat. No. 5,027,929, also assigned to United Technologies Automotive, the cable implemented interlock of U.S. Pat. No. 4,887,702 requires not only one or two relatively expensive cables but also requires a relatively precise cable length adjustment procedure during installation to ensure that the solenoid will operate properly.

SUMMARY OF THE INVENTION

The present invention provides a shifter interlock using an electromagnet to inhibit shifter operation until a specified condition, such as brake pedal depression, is satisfied, wherein the movable armature of the electromagnet is also mechanically tied to the vehicle ignition lock such that the armature may not be moved to a shifter-operable position until the ignition lock is released.

In general the invention comprises an automotive shifter having a shift lever and an axially movable shift lever release member which is movable between a first position in which primary shift lever movement is prevented and a second position in which primary shift lever movement is permitted. The axial or linear movability of the shift lever release member is determined by an electromagnet which locks or releases the shift release member according to the status of the specified condition. The ignition key lock includes a bolt or pin extendable into contact with the electromagnet armature to alternatively block and release movement of the bolt in accordance with the condition or status of the ignition key lock.

As a result the purely mechanical ignition key/shifter interlock is superimposed on the electromagnetic interlock so as to provide a multiple condition interlock which can be implemented without cables and without the complex installation procedures associated with cables.

In the illustrated embodiment the shift lever is steering column mounted and both the ignition key lock and the electromagnet are conveniently mounted on the steering column in close physical proximity so as to be in direct association with the shifter release member. In the preferred form the electromagnet holds a locking bolt in engagement with a notch in the shift lever release member and the ignition key lock operates in the manner of a bolt type lock to alternatively enable and inhibit movement of the bolt away from engagement with the release member.

The preferred embodiment of the invention uses an electromagnet holding device as opposed to the more conventional solenoid. In the latter device, energization of an electrically conductive coil creates an electromagnetic field which induces axial movement of a ferromagnetic core positioned inside the coil. An electromagnet holding device, by contrast, comprises a ferromagnetic canister which is magnetized when an electrically conductive coil disposed therein is energized. A non-ferrous bolt or shaft is slidingly mounted in a hole passing through the central axis of the canister and a ferromagnetic armature disk is attached to one end of the bolt. If the armature disk is in contact with the open end of the canister when it becomes magnetized by the energization of the coil, the disk will be held firmly in contact with the canister. If the disk is not in contact with the canister when it becomes magnetized, however, insufficient attractive force is exerted on the disk to draw it towards the canister. Thus the electromagnet device serves a "holding" function as opposed to the "pulling" function of the conventional solenoid.

A solenoid is usable in the present invention however a solenoid generally has lower holding power than an electromagnet of comparable size and weight. Consequently, a solenoid-based system would be larger and consume more raw materials and more power in operation than an electromagnet-based system. The relatively small size of the electromagnet-based system is also particularly advantageous in this application.

DESCRIPTION OF THE PREFERRED EMBODIMENT

Figure 1:
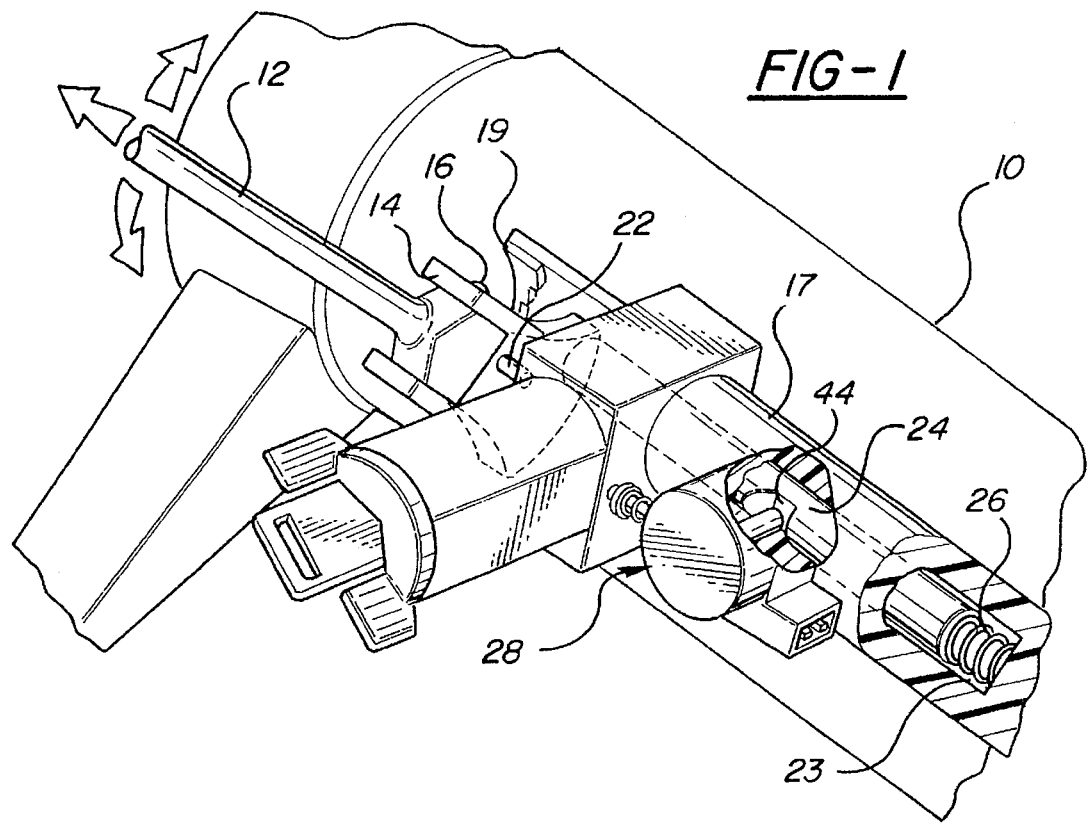
FIG. 1 is a partially cut away perspective view of the invention in assembly with a steering column mounted shift control mechanism viewed from the instrument panel more-or-less toward the driver.

FIG. 1 illustrates a portion of an automotive vehicle steering column 10 carrying a shift lever 12 for an automatic transmission, not shown. The shift lever 12 is conventional in operation, providing a primary motion about the axis of a pivot pin 22 parallel to the steering column 10 to shift the transmission between PARK and one of the conventional drive positions. A PARK detent lock comprising a pawl 18 formed integrally with the shift lever 12 and a detent plate 19 is engaged and released by a shift lever release motion about the axis of a release pin 16 held in bracket 14. The release movement, from the driver's vantage point, involves pulling the shift lever upward toward the driver to release pawl 18 from the PARK detent in plate 19, after which the primary lever movement is enabled.

Bracket 14 and shift lever 12 are mounted on a shifter housing 17 having a cylindrical inner bore 23 running in a direction substantially parallel to the longitudinal axis of steering column 10 and having an open end adjacent shift lever 12. A shift lever release member 24 is mounted for reciprocating linear movement in bore 23. A notch 44 is formed in the member 24 between the opposite ends for purposes explained below. A bias spring 26 is located at the lower end of inner bore 23 to urge release member 24 into a position in which it bears against the lower end of shift lever 12 in proximity with pawl 18. Spring 26, therefore, provides a bias force operative on the release mode of the shift lever, which bias force is easily overcome by the vehicle operator by pulling upward on shift lever 12 to pivot it about release pin 16. Pulling upward on shift lever 12 pushes downwardly on member 24 to partially compress spring 26.

An electromagnet 28 is mounted on shifter housing 17 and is connected in circuit with the vehicle electrical system (FIG. 6) by means of an electrical connector 32. As can best be seen in FIG. 2, electromagnet 28 comprises a housing 40 for an open-ended, generally cylindrical canister 36 having an axial through bore 31 which is arrayed at right angles to the axis of motion of release member 24. Canister 36 is made of a ferrous material and has an annular pocket 33 formed coaxial with bore 31. A coil 30 of copper wire is wound on a spool 35 which fits inside pocket 33. An armature disk 34 made of a ferrous material is fixed to a shaft 38 which is slidably mounted in axial bore 31. A spring 42 is positioned inside housing 40 to urge armature disk 34 and shaft 38 toward release member 24. When coil 30 is energized as hereinafter described, the resulting electromagnetic field magnetizes canister 36 so that disk 34 is held firmly in contact with the open end surfaces of canister 36 as shown in FIG. 2 such that release member 24 is held against significant movement in either direction.

When armature disk 34 is in contact with canister 36, shaft 38 extends into dead bolt engagement with notch 44.

Figure 2:
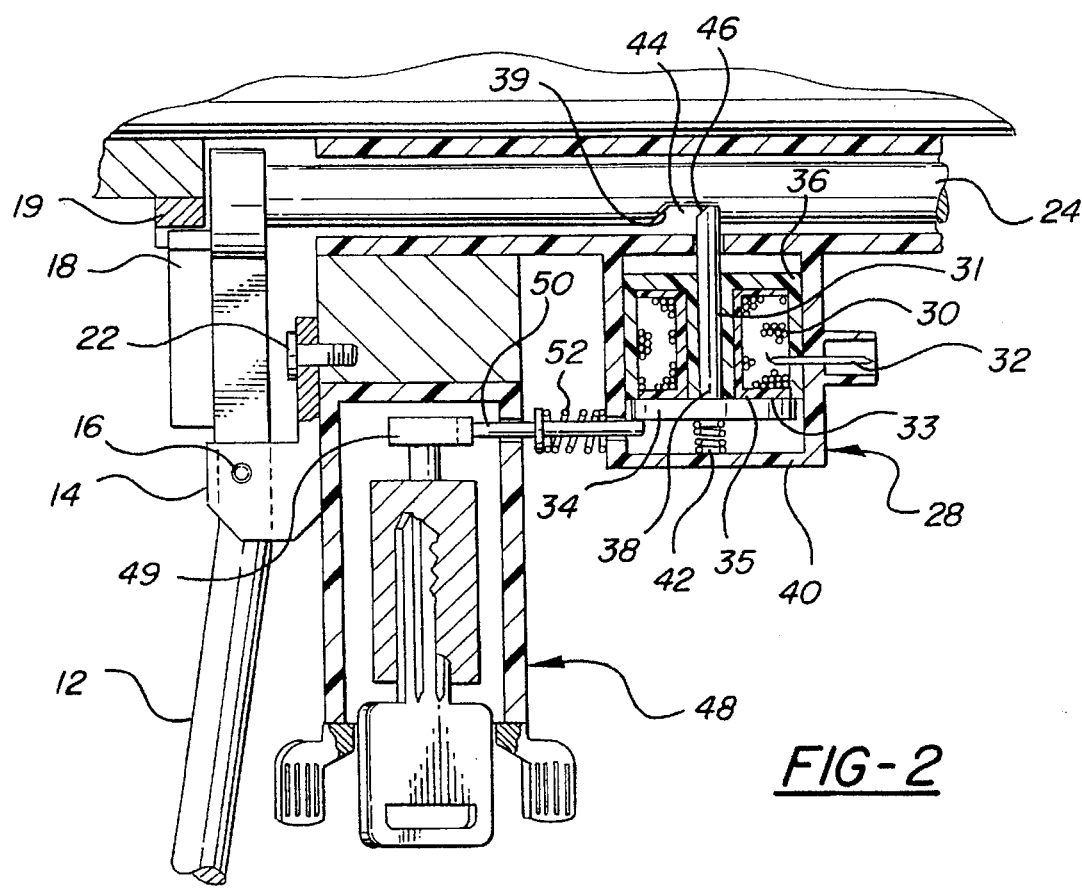
FIG. 2 is a sectional view of the interlock device with the shift control mechanism in PARK and the ignition switch in the Off position.

A chamfer 46 is preferably formed on the left side of notch 44 and a bevel 39 is formed on shaft 38 such that the two surfaces provide a cam action which forces shaft 38 downward when release member 24 moves to the right (FIG. 2). When electromagnet 28 is energized, however, it holds shaft 38 firmly in the extended position, so that its engagement with notch 44 effectively locks release member 24 in the position shown in FIG. 2. In this position, the shift lever 12 cannot with normal operator effort be pulled toward the driver to release pawl 18 from the PARK detent. Because the shift lever cannot with normal effort be released from the PARK detent, primary movement of the lever out of PARK is effectively prevented.

A key operated ignition switch 48 of the type commonly used in automobile ignition systems is mounted on shifter housing 17 adjacent electromagnet 28. Ignition switch 48 has an OFF position shown in FIGS. 1 and 2, and an ON position shown in FIGS. 3 and 4. In the OFF position, a cam 49 pushes a bolt pin 50 against the resistance of a compression spring 52 into housing 40 of electromagnet 28 where it prevents armature disk 34 from being moved away from the position shown in FIG. 2 where the shaft 38 extends into the notch 44 in release member 24. In the ON position, the bolt pin 50 is retracted to permit the disk 34 and bolt 38 to move downwardly as shown in FIG. 4.

Figure 6:
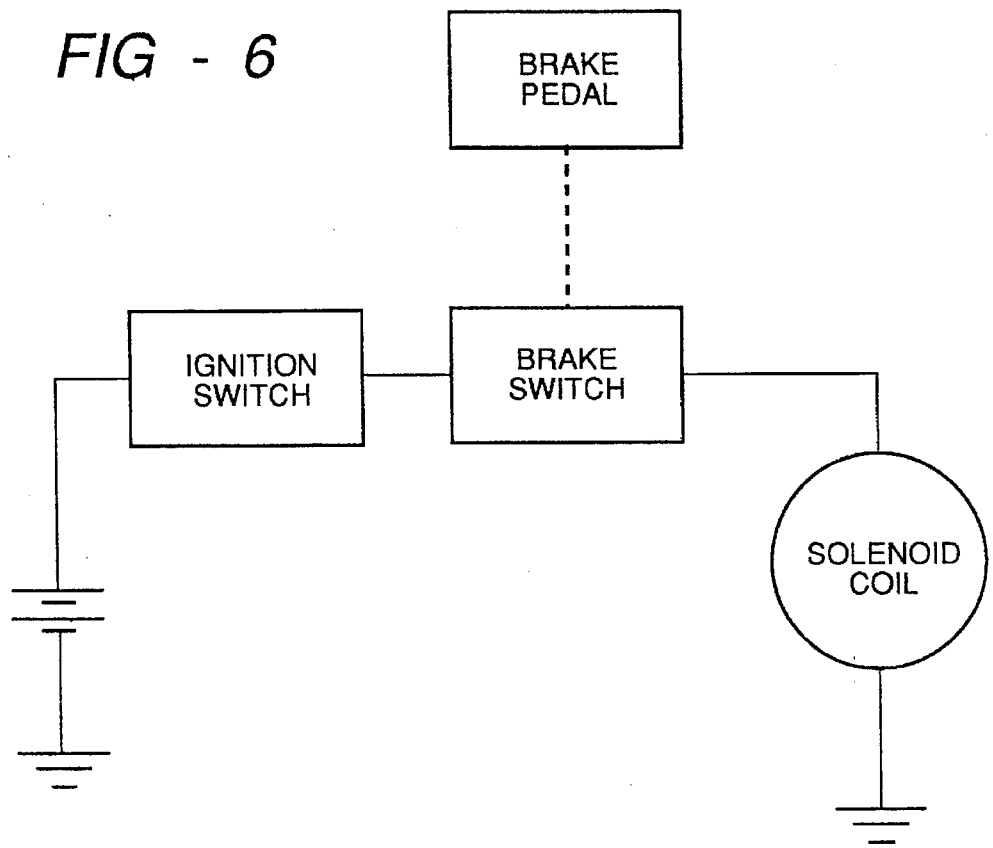
FIG. 6 is a schematic diagram of an electrical circuit for a brake/shift interlock utilizing the present invention.

Referring to FIG. 6, a circuit is shown to provide an interlock between the braking system of a motor vehicle and the shifter shown in FIGS. 1–5. In FIG. 6 a 12 volt automotive battery 60 is connected in series with electromagnet coil 30 through ignition switch 48 and a normally closed brake switch 64. When both switches 48 and 64 are closed, the coil 30 is energized and the armature disk 34 is held in the position shown in FIG. 2. Switch 64 is connected to brake pedal 62 to be opened when the brake pedal is depressed. Opening either of switches 48 and 64 de-energizes coil 30.

Operation

When the vehicle operator first enters the vehicle, shift lever 12 is in the PARK position and ignition switch 48 is in the OFF position. In this condition bolt pin 50 is extended to prevent movement of armature disk 34 away from release member 24. Even though there is no power to energize coil 30, shaft 38 is mechanically held in notch 44. This engagement holds release member 24 in the shift inhibit position in which it bears against the lower end of shift lever 12 to hold pawl 18 in engagement with the PARK detent. This configuration prevents the vehicle operator from pivoting shift lever 12 about release pin 16 to disengage pawl 18 from the PARK detent, so the shifter is locked in PARK.

Figure 3:
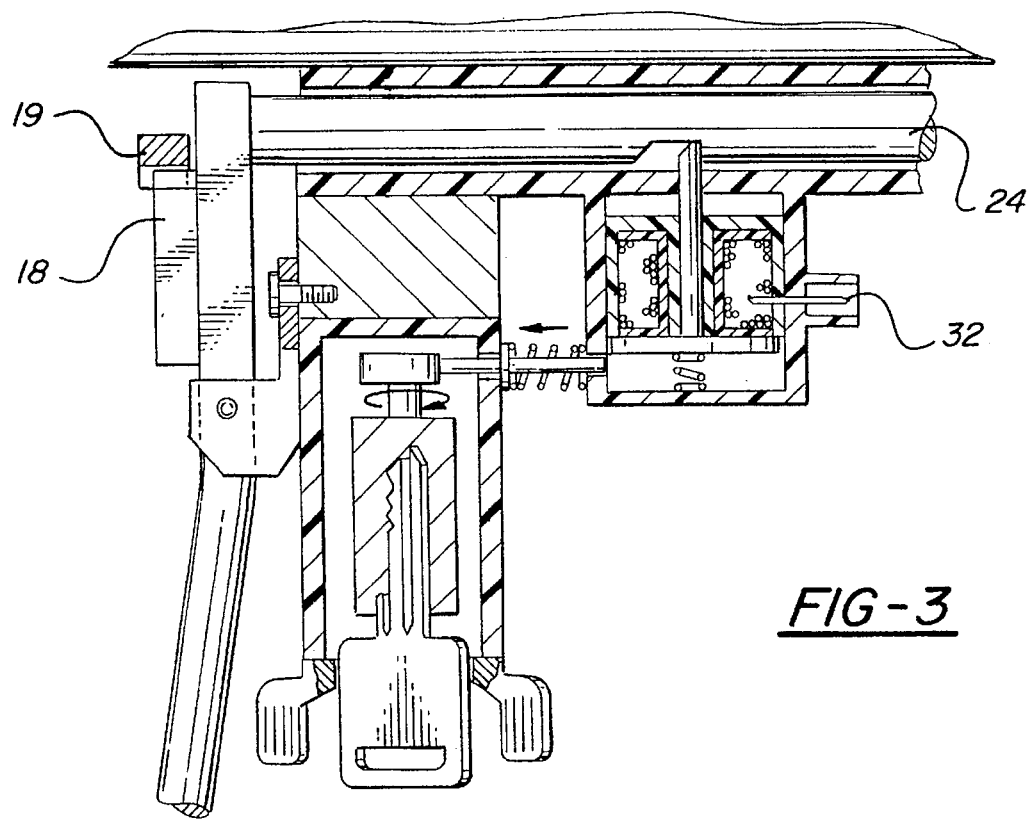
FIG. 3 is a sectional view of the interlock device with the shift control mechanism in PARK and the ignition switch in the On position.
Figure 4:
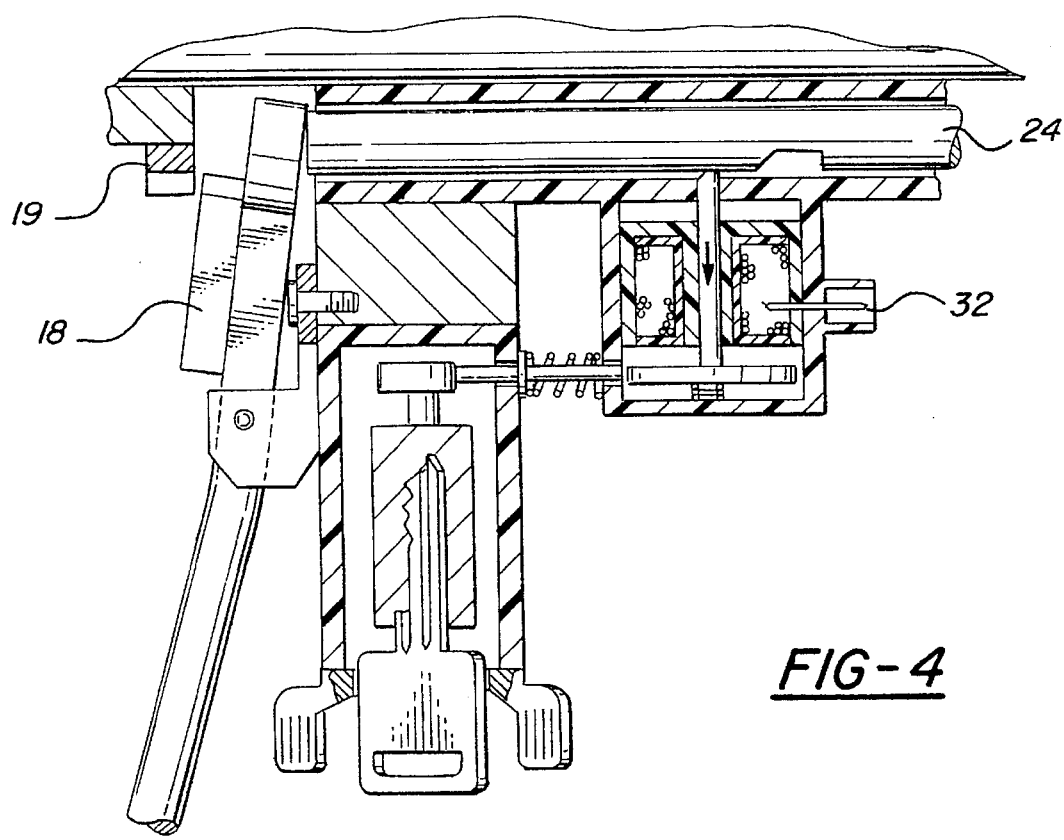
FIG. 4 is a sectional view of the interlock device with the shift control mechanism moved out of PARK and the shift lever release member moved away from its shift inhibit position.
Figure 5:
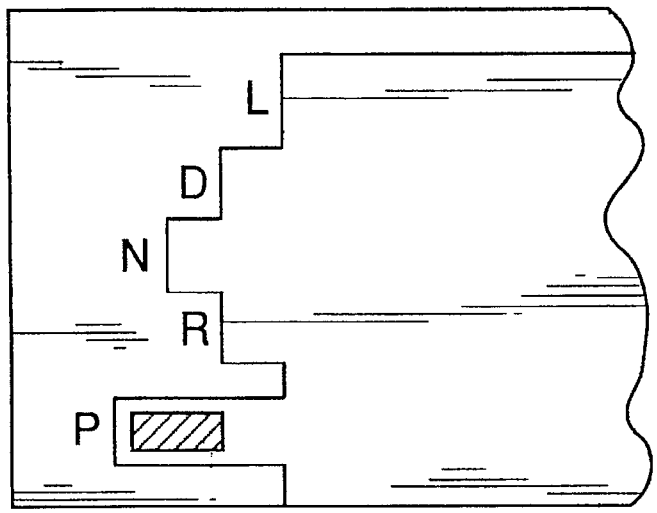
FIG. 5 is a sectional view showing the gear position detents in the detent plate.

When the operator moves ignition switch 48 to the ON position, bolt pin 50 moves to its retracted position in which it offers no opposition to movement of armature disk 34 (see FIG. 3). Moving the switch 48 to ON, however, also energizes electromagnet 28 so that armature disk 34 is magnetically held against the face of canister 34 and shaft 38 is firmly maintained in the extended position. The release movement of the gear shifter continues to be inhibited. Because of the chamfered face of notch 44, the interlock can be overcome by the application of greater than normal force to the shift lever 12.

When the operator depresses the vehicle brake pedal 62, switch 64 opens and coil 30 is de-energized, thus removing the electromagnetic force that holds shaft 38 in its extended position. When the operator pivots shift lever 12 about release pin 16, release member 24 is relatively easily pushed toward the position shown in FIG. 4 and the interaction between bevel 39 and chamfer 46 forces shaft 38 to its retracted position. The operator is now able to move shift lever 12 about pivot pin 22 and thereby shift the transmission out of PARK.

In the preferred embodiment of the invention, bevel 39 and chamfer 46 are shaped so that if the vehicle operator is pulling on shift lever 12 at the time coil 30 is de-energized, the force being applied to release member 24 will not result in binding between notch 44 and shaft 38 that might prevent movement of shaft 38 to its retracted position. This preload release geometry is described in detail in U.S. Pat. No. 5,176,231, issued Jan. 5, 1993 and assigned to Pontiac Coil, Inc. of Waterford, Mich., the disclosure of said patent being incorporated herein by reference.

The mechanism as described provides another vehicle safety feature in that ignition switch 48 can only be returned to its OFF position if shift lever 12 is first placed in PARK. This prevents the ignition key from being removed from ignition switch 48 until the vehicle is stopped and the transmission is in PARK.

An advantage of the mechanism described is that no sound audible to the vehicle operator will be produced when the brake interlock is deactivated by application of the vehicle brakes.

As is apparent from the above description and accompanying drawings, the present shift interlock mechanism provides a simple, compact, and reliable means by which to prevent a vehicle transmission shift lever form being moved out of PARK and into a driving gear range until the ignition switch 48 has been placed to the ON position and the brake pedal 62 has been depressed. The interlock mechanism adds a minimum of moving parts to the shifter, and the integration of the ignition switch and brake interlocks is executed so that the mechanism will easily fit inside of a steering column.

It will be appreciated that the drawings and description contained herein are merely meant to illustrate a particular embodiment of the present invention and are not meant to be limitations upon the practice thereof as numerous variations will occur to skilled persons. For example, the interlock mechanism may be moved to the console in whole or in part. Although the elimination of cables is advantageous, ignition lock 48 may be connected to bolt pin 50 with a cable if a remote location is desired. The coil 30 may be interlocked not only with a brake switch, but any switch operable within the vehicle's electrical system.

The invention claimed is:

1. A shifter interlock for an automotive vehicle comprising:

a shifter including a shift lever mounted for movement in and out of a PARK position;

electromagnetic means having a moveable armature and a shaft attached to the armature for movement therewith to alternatively inhibit and enable movement of the shift lever out of the PARK position according to the energization state of the electromagnetic means;

an electrical power circuit connecting the electromagnetic means with a vehicle power supply and including at least one switch for selectively energizing and de-energizing the electromagnetic means;

an ignition switch having an OFF and an ON position and serving to move a blocking means between a first position corresponding to the OFF position of the ignition switch and a second position corresponding to the ON position of the ignition switch, the blocking means in its first position being inserted into the electromagnetic means and into motion inhibiting contact with the armature to oppose movement of the shaft away from its shift inhibiting position, and in its second position offering no opposition to movement of the shaft.

2. The shifter interlock of claim 1 wherein the electromagnetic means further comprises:

an electromagnet which when energized acts on the armature to hold the shaft in the shift inhibiting position; and a spring which urges the shaft toward the shift inhibiting position.

3. The shifter interlock of claim 2 wherein the shift lever and the shaft are operatively associated such that when the electromagnet is in the de-energized state, movement of the shift lever out of the PARK position moves the shaft away from its shift inhibiting position.

4. The mechanism of claim 1 in which the electrical power circuit comprises:

a brake circuit operative such that the electromagnetic means is de-energized upon activation of a vehicle braking system.

5. A shifter interlock for an automotive vehicle comprising:

a shifter including a shift lever mounted for primary movement in and out of a PARK position and a release movement for engaging and disengaging a mechanical PARK detent;

a release member linearly movable between a first position in which it inhibits shift lever release movement and a second position in which it enables shift lever release movement;

electromagnetic means having a substantially rigid shaft movable between an extended position wherein the shaft protrudes into dead bolt engagement with the release member to inhibit movement of the release member to the second position and a retracted position wherein the shaft is withdrawn from engagement with the release member and movement of the release member is not inhibited, the electromagnetic means holding the shaft in the extended position when energized and permitting movement of the shaft to the retracted position when de-energized;

an electrical power circuit connected with the electromagnetic means and including at least one switch for selectively energizing and de-energizing the electromagnetic means; and an ignition switch mechanically associated with the electromagnetic means to inhibit movement of the shaft to the retracted position when the ignition switch is in an OFF position and to enable movement of the shaft to the retracted position when the ignition switch is in an ON position.

6. The shift interlock of claim 5 wherein the ignition switch in the OFF position inserts a blocking means into the path of movement of the shaft to hold the shaft in the extended position, and in the ON position retracts the block means from the shaft's path of movement to allow the shaft to move to the retracted position.

7. The shift interlock of claim 6 wherein the ignition switch is mounted immediately adjacent the electromagnetic means.

8. The shift interlock of claim 5 wherein the electrical power circuit comprises a brake circuit operative such that the electromagnetic means is de-energized upon activation of a vehicle braking system.

* * * * *